(12) United States Patent
Perret

(10) Patent No.: US 6,943,683 B2
(45) Date of Patent: Sep. 13, 2005

(54) LOCATION DEVICE

(75) Inventor: Stephane Perret, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 10/349,504

(22) Filed: Jan. 21, 2003

(65) Prior Publication Data

US 2003/0169156 A1 Sep. 11, 2003

(30) Foreign Application Priority Data

Jan. 21, 2002 (EP) ............................................. 02354014

(51) Int. Cl.[7] .......................... G08B 1/08; H04M 11/04
(52) U.S. Cl. ............. 340/538; 340/310.08; 340/825.36; 340/825.49
(58) Field of Search ....................... 340/310.01–310.08, 340/568.2, 558, 568.3, 568.4, 656, 687, 3.1, 7.29, 10.32, 825.36, 825.49, 571.2, 538

(56) References Cited

U.S. PATENT DOCUMENTS

| 5,434,775 | A | | 7/1995 | Sims et al. ................. 364/403 |
| 5,910,776 | A | | 6/1999 | Black ..................... 340/825.35 |
| 6,005,476 | A | * | 12/1999 | Valiulis ................. 340/310.01 |
| 6,731,201 | B1 | * | 5/2004 | Bailey et al. .......... 340/310.01 |

FOREIGN PATENT DOCUMENTS

WO        01/13185 A2    2/2001

* cited by examiner

Primary Examiner—Donnie L. Crosland

(57) ABSTRACT

A location device connectable to a power outlet of a mains power system, the location device being connectable to a power connection of a network appliance, the location device being operable to transmit location information to the network appliance via said power connection.

15 Claims, 2 Drawing Sheets

LOCATION DEVICE

FIELD OF THE INVENTION

This invention relates to a location device, a network appliance and a network.

BACKGROUND OF THE INVENTION

In conventional computer networks where a plurality of appliances are connected via the network, each appliance has a network address which enables information to be routed to it over the network. The network address has no correlation with the physical location of the appliance.

Providing network appliances with location awareness has many potential applications. These range from relatively simple applications such as inventory control so that for example an office manager would be able to identify the presence of each piece of equipment in an office or building, to more advanced applications such as providing information tailored to a user's physical location, such as the Hewlett Packard Cooltown project which aims to produce a connection between the physical and virtual worlds. A service location method for locating devices on a network could include the physical location of a network appliance as part of a search parameter.

A number of techniques for providing location awareness for networked devices have been proposed. For example, each device can be manually programmed with location information or provided with the location using a network bootstrap protocol such as BOOTP. However, when a device's location is changed, the change must be manually recorded in the device or the configuration database. Radio frequency identification (RFID) is a technique in which transducers, commonly known as tags, carry data and suitable readers can read a tag to retrieve the data. The data held in the tag may comprise any information as desired, and the distance at which a tag can be read depends in part on the power available to the reader and may be adapted to match the particular application required. To provide location awareness for a network appliance, it might be envisaged that, for example, a physical location may be provided with a tag and network appliances supplied with a reader to read the location information contained in the tag. Alternatively, a network appliance could be provided with a tag and a suitably powerful reader could be located in each physical location to read the tag of a network appliance placed in the that location.

A further system which uses radio frequency transmissions and which may be adapted to provide location information is Bluetooth, a protocol whereby devices may communicate over an ad hoc local network using radio communications. It is known to provide a "beacon" which transmits a location signal using a Bluetooth link to all devices in its range. A related technique is infra red beacons which transmit location information over an infrared link to devices equipped with suitable detectors, for example using the IrDA protocol.

These techniques are however disadvantageous in providing location awareness for network appliances in that they each require a relative complex infrastructure to provide location signals.

A simple protocol for enabling devices to communicate via a mains electricity power supply network in a building is the X10 protocol. X10 provides a robust system for signalling between devices by superimposing a high-frequency modulation on the relatively low frequency alternating current mains supply. Using X10, a control unit is connected to a device to be controlled, for example a light switch or power outlet and has an address set to one of 256 addresses using a manually settable switch. The control unit only responds to messages sent to that address. It is a feature of the X10 protocol that several control units can be provided with the same address such for example, a number of lights may be turned on or off with a single message.

The X10 protocol is disadvantageous in that an X10 control unit does not provide its address to a device connected to it, nor is the address necessarily correlated to the physical location.

An aim of the invention is to provide a new or improved location device for a network appliance which overcomes or reduces one or more of the above disadvantages.

SUMMARY OF THE INVENTION

According to a first aspect of the invention, we provide a location device connectable to a mains power outlet of a mains power system, the location device being connectable to a power connection of a network appliance, the location device being operable to transmit location information to the network appliance via said power connection.

According to this invention, a low cost location device is provided in a power socket which can transmit location information to a network appliance which is plugged into that socket.

The location device address information may comprise an identification number corresponding to the location device.

The location device address information may be transmitted periodically by the location device over the power connection.

The location device according may be operable to receive a location request from the network appliance and transmit location information in response to the location request.

The location device may be operable to detect the power connection of a network appliance and transmit location information when a power connection is detected.

The location device may further comprise a filter whereby the location information is not transmitted over the mains power system.

According to a second aspect of the invention, we provide a network appliance which comprises a power connection connectable to a mains power supply, the network appliance further comprising a receiver module operable to receive location information from a location device via the power connection.

The network appliance may comprise a network connection whereby the network appliance is operable to transmit the location information to a network via the network connection.

According to a third aspect of the invention, we provide a network comprising a server according to the second aspect of the invention, a location device according to the first aspect of the invention and a network appliance wherein the network appliance is operable to transmit the location information received from the location device to the server via the network connection.

The network server may comprise location device information whereby the server can read the location information and obtain a corresponding physical location for the network appliance.

The location device information may comprise a lookup table where the location information comprises an identification number and the lookup table comprises physical location information corresponding to each identification number.

DESCRIPTION OF THE DRAWINGS

An embodiment of the invention will now be described by way of example only with reference to the accompanying drawings wherein.

DETAILED DESCRIPTION OF THE PREFERRED EMBODIMENTS

Figure 1:
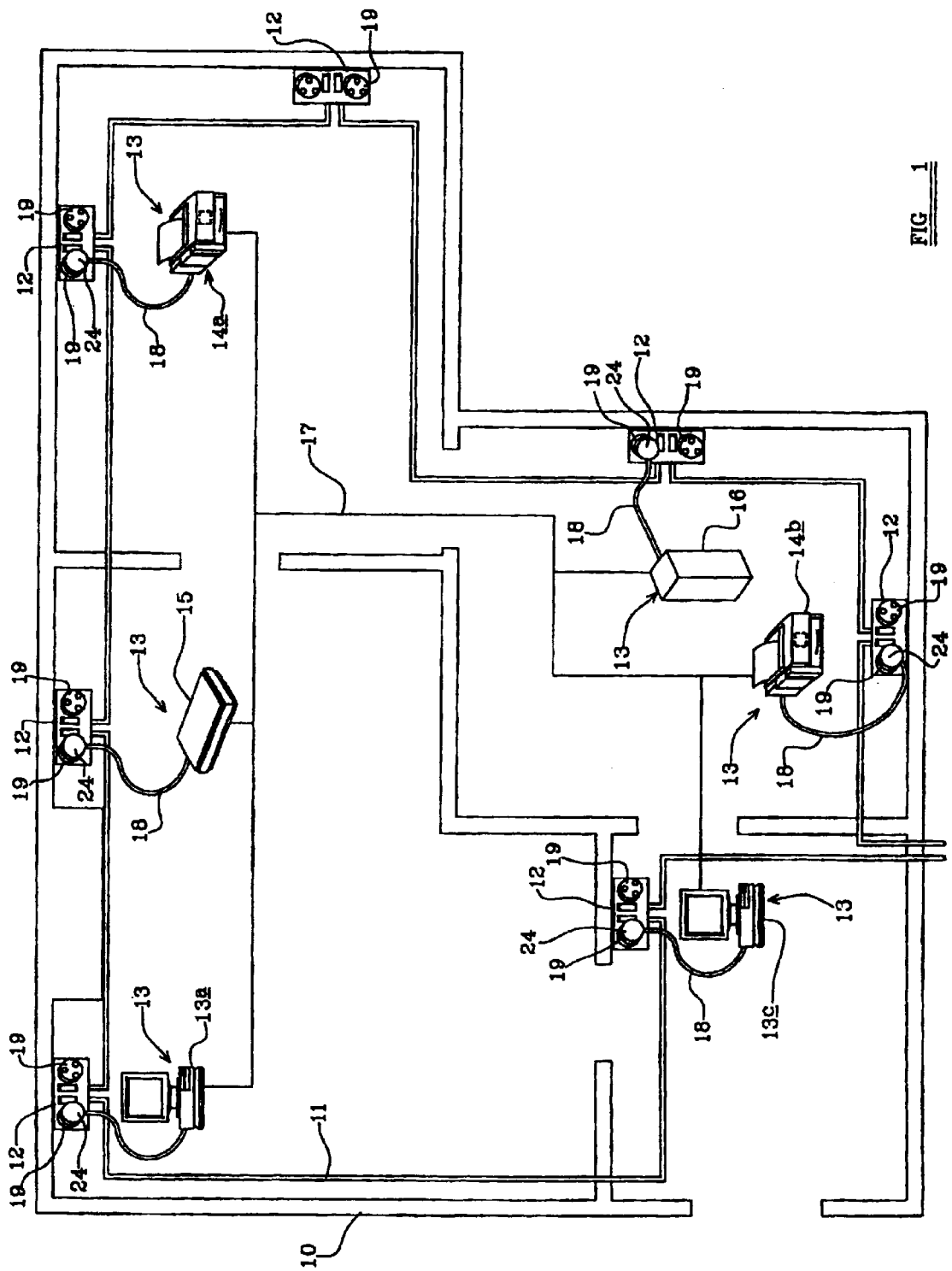
FIG. 1 is a diagrammatic illustration of a building provided with a network embodying the present invention.

Referring now to FIG. 1, a plan of a building or part of a building is generally shown at 10. The building 10 is provided with a electrical mains power system comprising a mains power supply circuit 11 of conventional type which is provided with a plurality of mains power outlets comprising sockets 12 distributed throughout the building 10 in conventional manner. A plurality of network appliances 13 are located within the building, in the present example purely by way of illustration comprising personal computers 13a and 13b, printers 14a and 14b, a scanner 15 and a server 16. The network appliances 13 are interconnected by a suitable network 17. Each network appliance is connected in conventional manner by a power cable 18 to a mains socket 12 of the main power circuit 11.

The network 17 of FIG. 1 is purely a diagrammatic illustration, and may comprise an electrical connection such as Ethernet or FireWire, a radio network such as Bluetooth or 802.11 or any other appropriate network as desired. Further, although FIG. 1 shows a network located within a building or part of a building, it will be clear that the present invention may be used with a much more widely dispersed network or even with devices interconnected via the internet.

Figure 2:
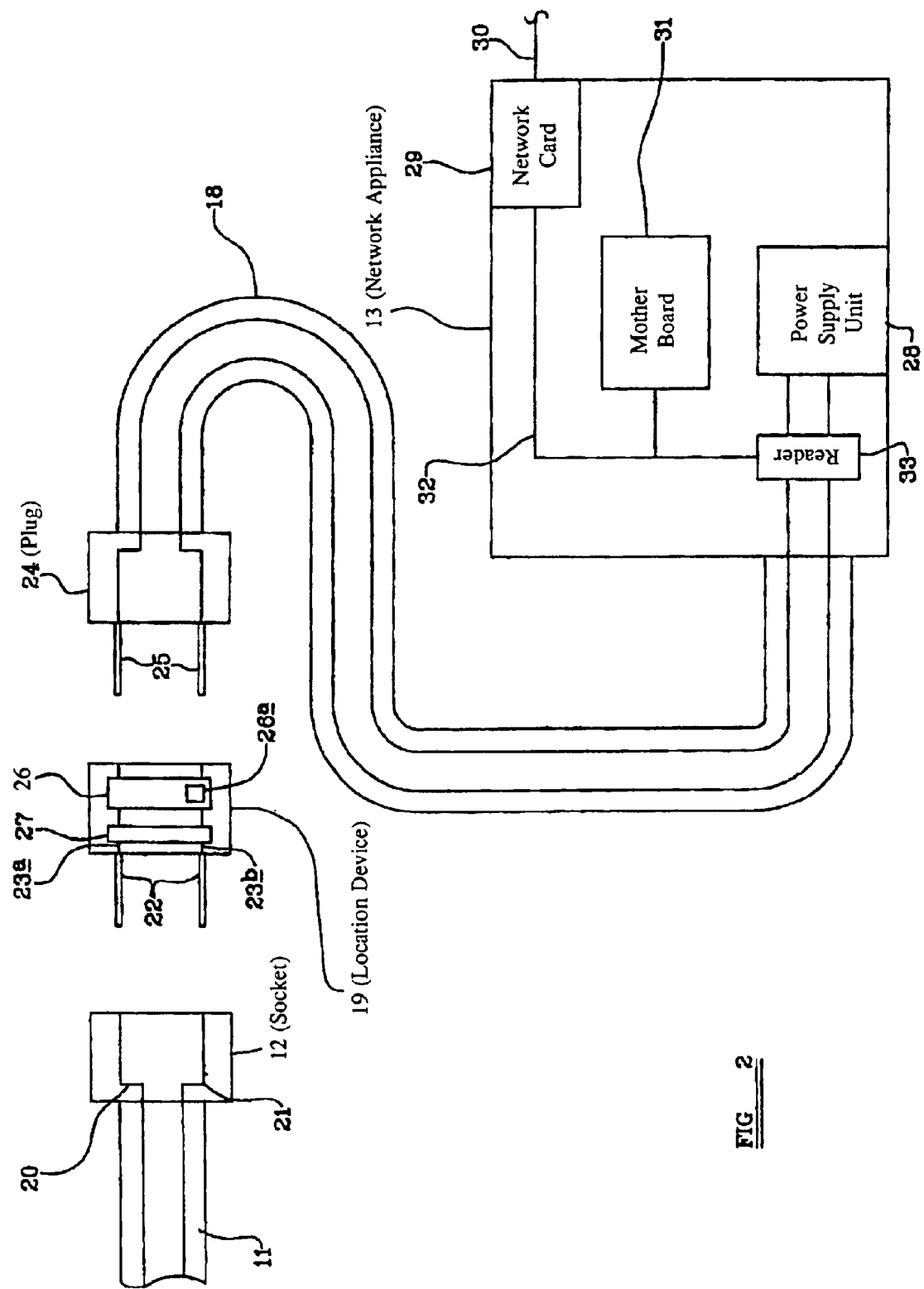
FIG. 2 is a diagrammatic illustration of a location device and a network appliance embodying the present invention.

Referring to FIG. 2, a socket 12 is shown in diagrammatic form with a live line 20 and a neutral line 21 connected to the mains power supply circuit 11 in conventional manner. The location device 19 comprises an appropriate number of pins, in this example two, to engage the socket 12 to make an appropriate electrical connection. The location device 19 similarly comprises a live line 23a and a neutral line 23b in conventional manner connected to pins 22 to engage the socket 12, and is provided with a suitable socket to receive a power connection comprising a plug 24 provided with pins 25 connected to a power line 18 for a network appliance 13. The location device 19 provides a through connection between the corresponding pins 25 and 22, such that the network appliance 13 is able to draw power from the mains power supply circuit via the socket 12 in conventional manner.

The location device 19 is provided with a location transmitter 26 and in this example a filter 27. The location transmitter 26 comprises a memory 26a in which location information is held, and is operable to modulate the mains alternating current such a way as to superimpose a location information signal encoding the location information on the alternating current. The filter 27 is arranged such that the location information signal superimposed on the alternating current is not transmitted into the mains power supply circuit 11.

Provided in the network appliance 13 is a power supply unit (PSU) 28 of conventional type which is connected to the plug 24 and pins 25 to receive mains current via the power cable 18 and transform or otherwise convert into the mains current electrical power for supply to the components of the network appliance 13. The modulation of the mains current by the location device 19 is of such a frequency and/or magnitude that the output of the PSU 28 is not affected. In addition or alternatively, the PSU 28 may be provided with a filter to remove the modulation.

The network appliance 13 in conventional manner has a network card 29 to provide a network connection 30 and a suitable mother board 31, in this example interconnected by a conventional bus 32. The network appliance 13 is further provided with a reader 33 which is able to detect the location information signal superimposed on the mains alternating current by the location device 19. The reader 33 then transmits the information via the bus, to the network card 29 or the mother board 31 or elsewhere as desired.

The invention thus provides a relatively inexpensive and simple method of providing automatic location detection for a network appliance. A location device 19 is provided with location information and plugged into a socket 12. A location device 19 may of course be provided integrally with the mains socket 12 if desired. When a network appliance 13 is plugged into a socket 12 comprising a location device 19, the location device will transmit location information via the power cord 18 on the mains alternating current where it is read by the reader 33 and made available to the network appliance 13. The location device 19 may, periodically transmit the location information, or may transmit the location information in response to an enquiry from the network appliance 13 transmitted by the reader 33, or may detect power being drawn from the mains power circuit 11 by a network appliance 13, thus indicating that a network appliance 13 has been plugged in and the power turned on and transmit the location information in response.

The network appliance 13 then makes the location information available over the network 17 to other network appliances 13. The location information may be encoded as desired. For example, the location information may comprise a unique identification number associated with that location device. To provide a physical location, the server 16 may have a table which gives a physical location corresponding to the location information transmitted by each location device so that the server 16 acts as a name server maintaining the mapping <socket location-signal, room-name> in a look up table. Alternatively, all of the network appliances 13 may be provided with such a look up table. Further alternatively, the location information may actually encode details of the physical location stored in the store 26a, for example "room number 3, north west corner". The location information may be in any format and provided and accessed in any manner as desired. The location information may be used for any application where physical location information may be useful.

If the network appliance 13 is subsequently moved to a different location and is plugged into a different socket 12, it will then receive new location information from the location device 19 connected with that socket, and will be able to make the new location information available over the network 17. The device's new physical location is thus made available automatically.

The location information signal may be superimposed on and read from the alternating mains current using any encoding and transmission protocol as desired, for example the same technique as the X10 protocol or any other suitably robust communication protocol and any appropriate electronic implementation as necessary.

It might be envisaged that the network 17 comprises a power-line network which uses the mains power supply circuit 11 as a communications network. In such circumstances the filter 27 may be omitted, or alternatively the frequency at which the location information is transmitted by the location device 19 to the network appliance 13 and the frequency at which the network appliance 13 transmits the information over the power line network may be different and the filter 27 may be selected to block the location information signal but not network transmissions to and from the main power supply circuit 11.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A location device connectable to a power outlet of a main power system, the location device being connectable to a power connection of a network appliance, the location device being operable to transmit location information to the network appliance via said power connection.

2. A location device according to claim 1 wherein the location information comprises an identification number corresponding to the location device.

3. A location device according to claim 1 wherein the location information encodes physical location information.

4. A location device according to claim 1 wherein the location information is transmitted periodically by the location device over the power connection.

5. A location device according to claim 1 wherein the location device is operable to receive a location request from the network appliance and transmit location information in response to the location request.

6. A location device according to claim 1 operable to detect the power connection of a network appliance and transmit location information when a power connection is detected.

7. A location device according to claim 1 further comprising a filter whereby the location information is not transmitted over the main power system.

8. A network appliance comprising a power connection connectable to a main power system, the network appliance further comprising a reader operable to receive location information from a location device via the power connection.

9. A network appliance according to claim 8 comprising a network connection whereby the network appliance is operable to transmit the location information to another network appliance via the network connection.

10. A network comprising a server, a location device according to claim 1 and a network appliance comprising a power connection connectable to a main power system, the network appliance further comprising a reader operable to receive location information from a location device via the power connection, and wherein the network appliance is connected to the location device and is operable to transmit the location information received from the location device to the server via the network connection.

11. A network according to claim 10 wherein the server comprises location device information whereby the server can read the location information received from the network appliance and obtain a corresponding physical location for the network appliance.

12. A network according to claim 11 wherein the location device information comprises a lookup table where the location information comprises an identification number and the lookup table comprises physical location information corresponding to each identification number.

13. A method of obtaining a location information of a network appliance, said method comprising:

selecting a network appliance;

selecting a location device connectable to a power outlet of a main power system and a power connection of said network appliance; and transmitting location information from said location device to said network appliance via said power connection.

14. The method of claim 13 wherein said location device transmits said location information in response to receiving a location request from said network appliance.

15. The method of claim 13 wherein said location device transmits said location information upon detection of power connection of said network appliance.

* * * * *